(12) United States Patent
Fetterman

(10) Patent No.: US 6,212,066 B1
(45) Date of Patent: Apr. 3, 2001

(54) PORTABLE COMPUTER WITH REMOVABLE KEYBOARD

(75) Inventor: Kevin Scott Fetterman, Sunnyvale, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/405,552

(22) Filed: Sep. 24, 1999

(51) Int. Cl.[7] .................................................. G06F 1/16
(52) U.S. Cl. ......................... 361/680; 345/168; 235/145; 248/917
(58) Field of Search ............................... 361/680; 341/22; 345/168–172; 235/145–149; 248/917–920

(56) References Cited

U.S. PATENT DOCUMENTS

| 4,903,222 | 2/1990 | Carter et al. .......................... 364/708 |
| 5,153,589 | 10/1992 | Heys, Jr. et al. ..................... 361/390 |
| 5,287,245 | 2/1994 | Lucente et al. ....................... 361/680 |
| 5,331,508 | 7/1994 | Hosoi et al. .......................... 361/680 |
| 5,335,141 | 8/1994 | Hosoi .................................... 361/818 |
| 5,443,320 | * 8/1995 | Agata et al. .......................... 361/680 |
| 5,546,334 | * 8/1996 | Hsieh et al. .......................... 361/680 |
| 5,966,284 | * 10/1999 | Youn et al. ........................... 361/680 |
| 6,064,564 | * 5/2000 | Song et al. ............................ 361/681 |

* cited by examiner

*Primary Examiner*—Leo P. Picard
*Assistant Examiner*—Hung Van Duong
(74) *Attorney, Agent, or Firm*—Beyer Weaver & Thomas, LLP

(57) ABSTRACT

Improved housings for computing devices are disclosed. The improved housings are provided with a movable keyboard (e.g., removable keyboard) that can be opened or removed to gain easy access to internal components of a computing device. The movable keyboard can be secured to the computing device using a keyboard securing system. An actuator can also be used to dislodge the movable keyboard from the computing device when the movable keyboard is to be opened or removed. A lock arrangement can additionally be used to lock the movable keyboard to the computing device.

30 Claims, 4 Drawing Sheets

PORTABLE COMPUTER WITH REMOVABLE KEYBOARD

BACKGROUND OF THE INVENTION

1. Field of the Invention

The present invention relates generally to computer systems and, more particularly, to improved features for computer system housings.

2. Description of the Related Art

All computing devices, including portable computers, have housings that enclose the components and circuitry of the computing devices (e.g., a microprocessor, Read-Only Memory (ROM), Random-Access Memory (RAM), a disk drive, a battery, and various input/output (I/O) support circuitry). With portable computers, access to components with the housings has always been problematic. While the housing could be completely disassembled to gain access, such disassembly is unworkable for users of the portable computers who often lack tools and skill to perform the disassembly. Another existing approach to provide some limited access to one or a few components is to provide a trap door in the housing. Unfortunately, the design and implementation of the trap doors lead to problems.

One problem associated with conventional trap doors is that they complicate the housing design of the portable computer. The presence of trap doors also reduces the strength of the housing because of the opening created for the trap door. As is well known in the art, a more rigid housing provides greater protection of the internal components of the computer and increased durability of the computer as a whole. However, as housings become thinner and lighter, particularly in portable computers, the housings unfortunately become more flexible and thus less rigid. Correspondingly, when trap door openings are formed in the housing, the housing becomes even more flexible and less rigid. As a result, the protection of the internal components and the durability of the computer is reduced.

Another problem associated with conventional trap doors is that they are not easily utilized by users. Often trap doors are assembled and held in place with fasteners (e.g., screws, bolts). Using fasteners has many disadvantages. For example, if a user wants to gain access to an internal component of the portable computer, such as a memory board, the user has to spend a certain amount of time removing the fasteners to open the trap door. Furthermore, the removal of fasteners requires the user to have special tools and often some general technical skill in order to remove the trap door. Conventional trap doors also often need to be pried out from the housing in order to be removed. Typically, the trap doors do not provide surfaces for grasping with a finger or hand. In some applications this makes the trap door difficult to remove. In effect, a prying tool may be needed to remove the trap door from the housing. Fasteners can also cause design and aesthetic difficulties, particularly as designs become more complex and thinner. Furthermore, trap doors have mating surfaces that produce can undesirable cracks along surfaces of the housing.

Thus, there is a need for improved approaches for accessing internal components of computing devices.

SUMMARY OF THE INVENTION

Broadly speaking, the invention pertains to an improved housing for computing devices. More particularly, a first aspect of the invention pertains to a movable keyboard (e.g., removable keyboard) that can be opened or removed to gain easy access to internal components of a computing device. The movable keyboard can be secured to the computing device using a keyboard securing system. An actuator can also be used to dislodge the movable keyboard from the computing device when the movable keyboard is to be opened or removed. A second aspect of the invention pertains to a lock arrangement suitable for locking the movable keyboard to the computing device.

The invention can be implemented in numerous ways, including as an apparatus, a device, and a computer system. Several embodiments of the invention are discussed below.

The invention relates, in one embodiment, to a computer system having a keyboard. The computer system includes a computer housing containing internal components, and having an opening. The computer system further includes a movable keyboard having a plurality of keys, and being configured for placement in the opening. Correspondingly, after the movable keyboard is placed in the opening for operation of the computer system, the movable keyboard can be at least substantially moved out of the opening to provide access to the internal components within the computer housing.

The invention relates, in another embodiment, to a portable computer device having a keyboard. The portable computer device includes a computer housing containing internal components, and having an opening that provides access to the internal components. The portable computer device further includes a removable keyboard having a plurality of keys, and being configured for placement in the opening. The portable computer device additionally includes an actuator that exerts a force on the removable keyboard in a direction away from the opening such that the actuator moves at least a portion of the removable keyboard out of the opening.

The invention relates, in yet another embodiment, to a portable computer device having a keyboard. The portable computer device includes a computer housing containing internal components, and having an opening. The portable computer device further includes a movable keyboard having a plurality of keys, and being configured for placement in the opening. The portable computer device additionally includes a lock being coupled to the computer housing and configured to lock the movable keyboard to the computer housing such that the movable keyboard is prevented from moving away from the computer housing.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The invention pertains to an improved housing for computing devices. More particularly, a first aspect of the invention pertains to a movable keyboard (e.g., removable keyboard) that can be opened or removed to gain easy access to internal components of a computing device. The movable keyboard can be secured to the computing device using a keyboard securing system. An actuator can also be used to dislodge the movable keyboard from the computing device when the movable keyboard is to be opened or removed. A second aspect of the invention pertains to a lock arrangement suitable for locking the movable keyboard to the computing device.

Embodiments of the invention are discussed below with reference to FIGS. 1–4. However, those skilled in the art will readily appreciate that the detailed description given herein with respect to these figures is for explanatory purposes as the invention extends beyond these limited embodiments.

Figure 1:
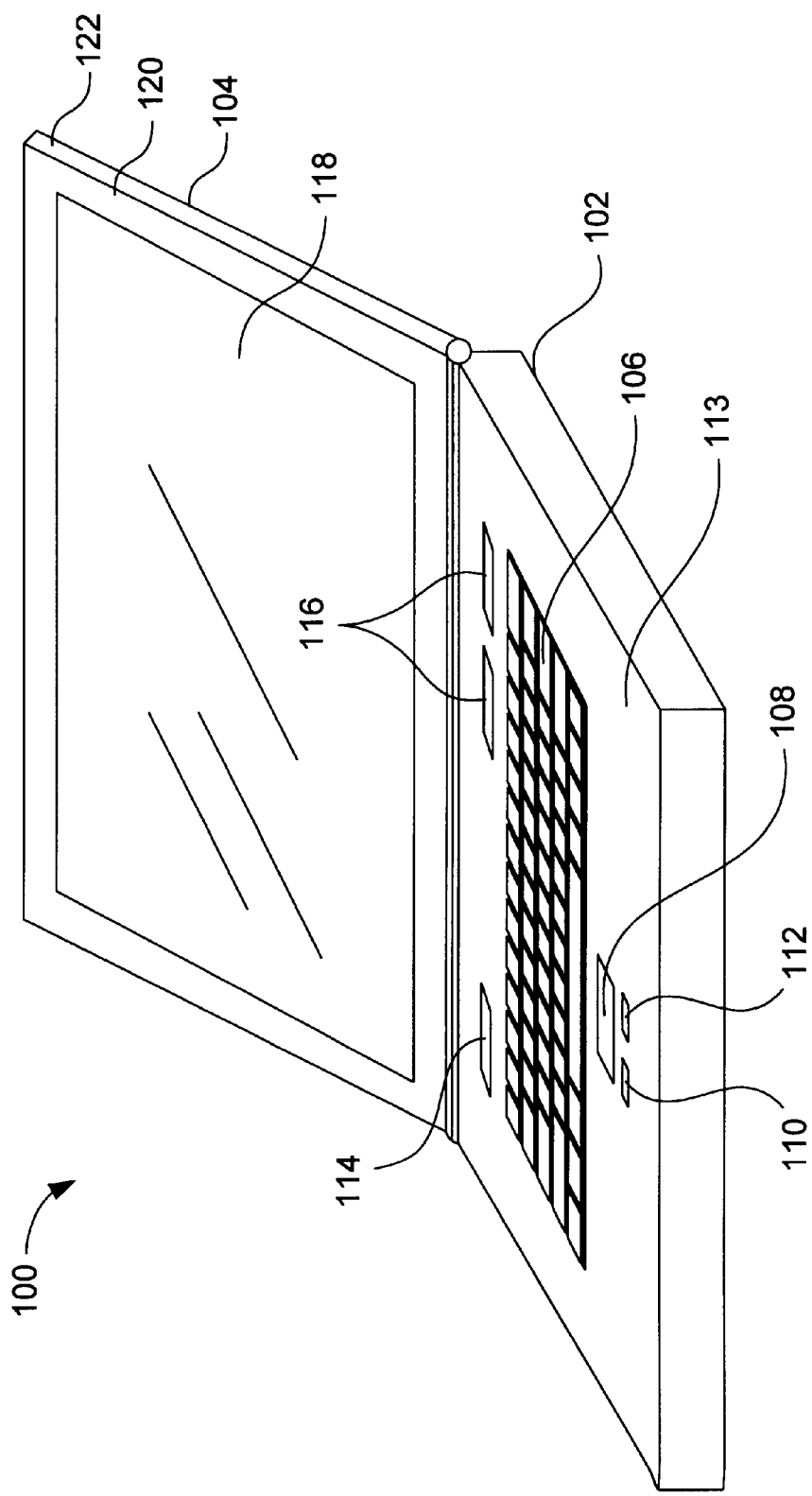
FIG. 1 is a perspective diagram of a portable computer.

FIG. 1 is a perspective diagram of a portable computer 100. The portable computer 100 includes a base 102 and a lid 104. The base 102 houses internally various integrated circuit chips and other circuitry to provide computing operations for the portable computer 100. The integrated circuit chips and other circuitry include a microprocessor, Read-Only Memory (ROM), Random-Access Memory (RAM), a disk drive, a battery, and various input/output (I/O) support circuitry. The base 102 also includes a keyboard 106 (or keyboard) that allows a user of the portable computer 100 to enter alphanumeric data. According to the invention, the keyboard 106 is movable such that it can be opened or removed. Once the keyboard 106 is opened or removed, various internal components of the portable computer 100 become accessible. The movability of the keyboard 106 is described in detail below.

The base 102 also includes a track pad 108 and associated buttons 110 and 112. The track pad 108 is an input device for the portable computer 100 and generally represents an input pointer device. The associated buttons 110 and 112 allow a user to make a selection with respect to a graphical user interface. The track pad 108 and the buttons 110 and 112 are located in an upper, front area of the base 102 referred to as a palm rest 113. Additionally, the base 102 includes a power switch 114 and miscellaneous switches 116.

The lid 104 is coupled to the base 102 by way of a hinge mechanism (not shown). As such, the lid 104 can rotate into an open position or a closed position 110 with respect to the base 102. As illustrated in FIG. 1, the lid 104 is in the open position. The lid 104 contains a liquid crystal display (LCD) 118. The LCD display 118 is visible to a user of the portable computer 100 when the lid 104 is in the open position, such as illustrated in FIG. 1. The LCD display 118 is used to display the graphical user interface (including perhaps a pointer or cursor) as well as other information to the user. The LCD display 118 is surrounded at a peripheral region by a bezel 120 that serves to support the LCD display 118 in its assembled position within the lid 104. When the lid 104 is in a closed position, an outer surface 122 of the lid 104 is visible but the LCD display 118 and the bezel 120 are no longer visible to the user.

Figure 2:
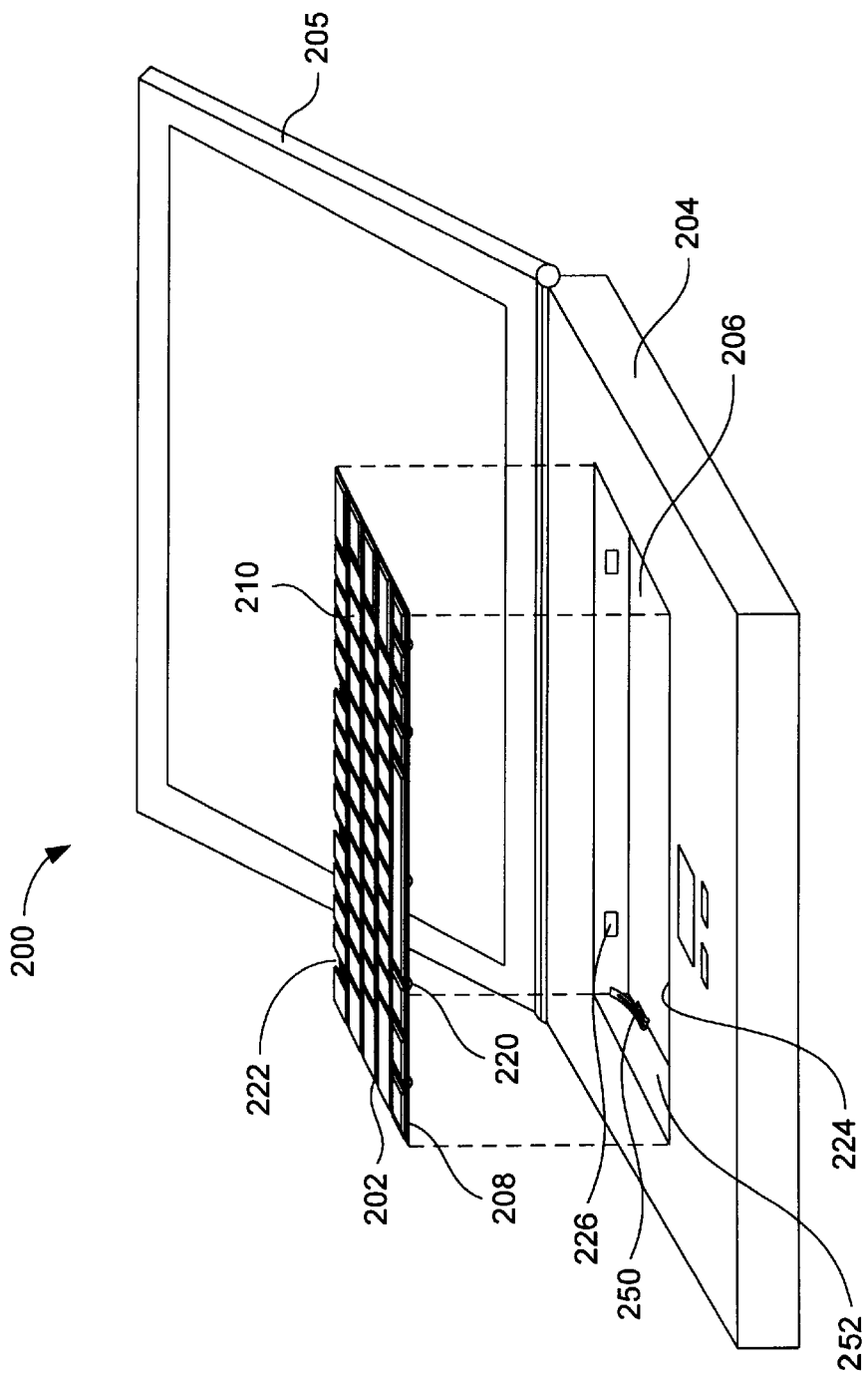
FIG. 2 is a perspective diagram of a portable computer with a movable keyboard according to one embodiment of the invention.

According to a first aspect of the invention, a computing device is provided with a movable keyboard such that access to internal components of the computing device is provided. FIG. 2 illustrates a movable keyboard 202 arranged away from a portable computer 200, in accordance to one embodiment of the present invention. The portable computer 200 includes a base 204 and a lid 206 which, for example, respectively correspond to the base 102 and the lid 104 illustrated in FIG. 1. The portable computer 200 is also illustrated in the open position in FIG. 2.

The base 204 is arranged to have an opening 206 configured for receiving the movable keyboard 202. Preferably, the inside perimeter of the opening 206 coincides with the outside perimeter of the movable keyboard 202. For the most part, the outer perimeter of the movable keyboard 202 is determined by the outer perimeter keys of the movable keyboard 202. Furthermore, the movable keyboard 202 includes a support member 208 for supporting a plurality of keys 210. Preferably, the support member 208 has a shape that is substantially similar to a shape formed by the outer perimeter keys of the movable keyboard 202. In one implementation, the support member 208 is formed from an aluminum sheet, for example, 5052 series aluminum sheet.

Further, when the movable keyboard 202 is disposed within the opening 206, the top surface of the support member 208 is substantially flush with the outer top surface of the base 204. The position of the movable keyboard 202 within the opening 206 is also arranged with respect to the LCD screen when the lid 205 is closed to provide a gap between the top portion of the keys and the surface of the LCD screen to prevent damage to the LCD screen. In one implementation, at least a 1.3 mm gap is suitable.

Although not shown in FIG. 2, the movable keyboard 202 is operatively coupled to the internal components of the computer. By way of example, this coupling may be through a group of data transmission wires (e.g., a ribbon cable). The data transmission wires may be configured to allow the movable keyboard 202 to be removed and moved a substantial distance away from the computer. In other words, the keyboard 202 can be completely removed from the opening 206 of the base 204. If desired, the movable keyboard 202 can be completely disconnected from the data transmission wires. Alternatively, the movable keyboard 202 may, for example, be movably coupled to the computer housing or base 204 through rotation about a hinge. When the movable keyboard 202 is rotated about the hinge, the keyboard 202 is largely removed from the opening 206 of the base 204 except for the portion at the hinge. In any case, however, the movable keyboard 202 is typically fixed to the computer housing during use of the movable keyboard.

The movable keyboard 202 can be secured to the portable computer using a keyboard securing system. In one embodiment, the keyboard securing system secures the movable keyboard 202 within the opening 206 of the computer housing.

In one implementation, the movable keyboard 202 includes the keyboard securing system for securing the movable keyboard 202 to the computer housing or base 204. In this implementation, the keyboard securing system includes a hook and a latch. The hook is configured for engaging a first portion of the computer housing, and the latch is configured for engaging a second portion of the computer housing. When the hook and latch are engaged with their respective portions of the computer housing, they secure the movable keyboard 202 to the computer housing.

As shown in FIG. 2, the movable keyboard 202 includes hooks 220 and latches 222. Furthermore, the base 204 includes a plurality of hook mating elements 224 and latch mating elements 226. The hooks 220 are configured to engage the hook mating elements 224, and the latches 222 are configured to engage the latch mating elements 226 to hold the movable keyboard 202 in place. Preferably, the mating elements are positioned within the inner peripheral surface of the opening 206. In one embodiment, the hook mating elements 224 and latch mating elements 226 are configured to be slots that substantially coincide with the shape of the hooks 220 and latches 222.

Furthermore, the hooks 220, latches 222 and their respective mating elements 224 & 226 are configured to keep the movable keyboard 202 substantially level when the movable keyboard 202 is disposed in the opening 206 of the computer housing. Further still, the hooks 220 and the latches 222 are preferably configured as load bearing members that support the movable keyboard 202 in the opening 206 of the computer housing against loads such as a user typing on the movable keyboard 202. Correspondingly, the latches 222 can be disposed directly opposite the hooks 220 for strength and deflection reasons. Optionally, the opening 206 may include a recessed lip for providing further load bearing support for the movable keyboard 202. Also, the movable keyboard 202 may rest on structures or components within or part of the computer housing to provide additional support. In addition, inserts may be used to space the movable keyboard 202 a certain distance away from the internal components of the computer. Examples of inserts include a foam pad or a polycarbonate sheet.

Figure 3A:
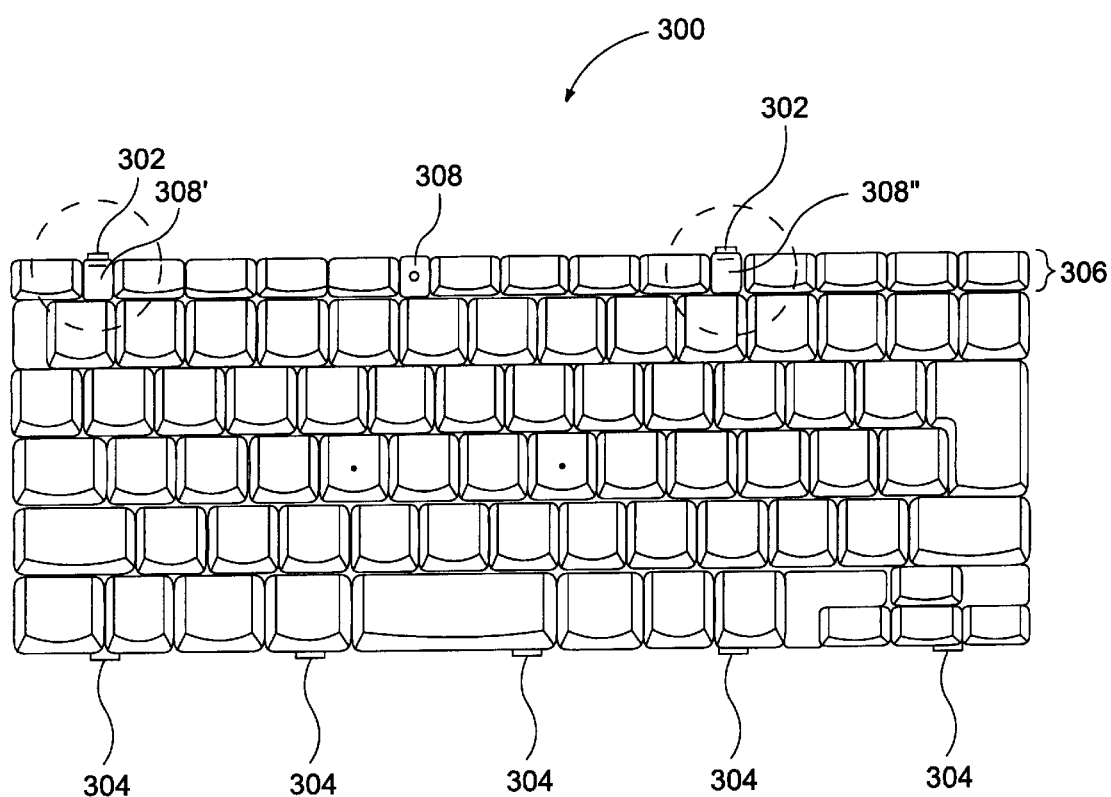
FIG. 3A depicts a top view of a movable keyboard according to one embodiment of the invention.

To elaborate further, FIG. 3A illustrates a top view of a movable keyboard 300, which may be the movable keyboard 202 of FIG. 2, in accordance with one embodiment of the present invention. The movable keyboard 300 includes a pair of latches 302 to provide load support to the movable keyboard 300. Preferably, the pair of latches 302 are configured to be spaced apart to distribute a load or force exerted on the keyboard. However, it should be noted that any number of latches may used so long as they provide load support for the movable keyboard.

Furthermore, the latches 302 are preferably arranged inside the envelope (perimeter defined by the outer perimeter keys) of the movable keyboard 300. More preferably, the latches 302 are disposed inside a top row of keys of the movable keyboard 300 and even more preferably disposed inside a function key row 306 of the movable keyboard 300. Still further, latches 302 are preferably disposed between two keys in the function key row 306 and more preferably disposed within dummy keys 308 and even more preferably disposed within the left and right function row dummy keys 308' and 308". For the most part, the dummy keys 308 are open spaces between a group of function keys in the function key row 306. By disposing the latches 302 in the dummy keys of the movable keyboard 300, the movable keyboard 300 advantageously reduces the need for providing an extended envelope around the outer periphery of the movable keyboard 300 to hold the latches 302.

More importantly, the latches 302 are configured to secure the movable keyboard 300 inside the opening of the base of the computer housing (e.g., opening 206 of the base 204 of FIG. 2). In one embodiment, the latches 302 are movably coupled to the movable keyboard 300 in order to engage and disengage with the computer housing. Preferably, the latches 302 can be moved between a first position and a second position. When the latches 302 are in the first position, the movable keyboard 300 is secured in place as the latches 302 couple to the computer housing. Alternatively, when the latches 302 are in the second position, the latches 302 disengage from the computer housing and thus the movable keyboard 300 becomes movable. Additionally, the latches 302 are preferably arranged to allow a user to move the latches 302 from the first position to the second position with ease through, for example, use of two fingers. In this manner, the latches 302 may be easily engaged and disengaged from the computer housing.

Figure 3B:
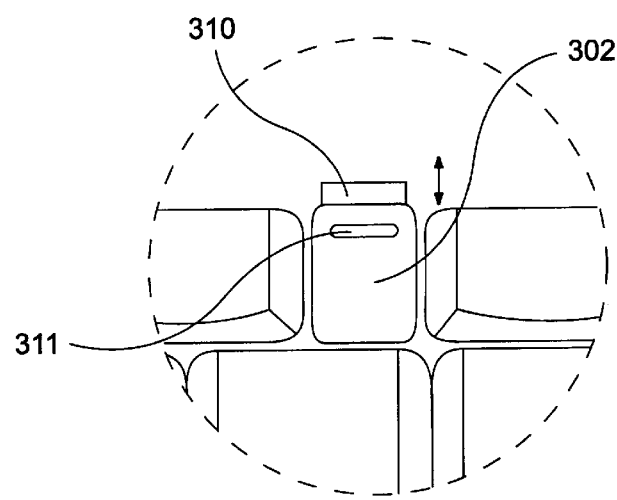
FIG. 3B depicts a top view of a movable keyboard latch system broken away from a keyboard according to one embodiment of the invention.

In accordance with one embodiment of the present invention, FIG. 3B depicts a detailed top view of the latch 302 illustrated in FIG. 3A. Preferably, the latch 302 is configured with a blade 310 for engaging (e.g., in the first position) and disengaging (e.g., in the second position) with the mating elements (e.g., the latch mating elements 226) of the base 204 shown in FIG. 2. When the blade 310 is engaged with the mating element, the movable keyboard 300 is held in place and secured within the opening of the computer housing. When the blade 310 is disengaged from the mating element, the movable keyboard 300 is free to move and thus may be removed from the opening in the computer housing. Additionally, the latch 302 may include a ridge 311 configured to provide a surface for moving the latch 302 with a finger.

Furthermore, the latch 302 preferably includes a spring (not shown) that biases the latch 302 in a direction away from the outer perimeter of the movable keyboard 300 (i.e., biases towards the engagement position or first position). In order to secure the movable keyboard 300 inside the opening, the latch 302 is pushed back against the spring force thereby allowing enough space to place the movable keyboard 300 in the opening. Once the movable keyboard 300 is disposed in the opening, the latch 302 may be released and thus have the blade 310 engage the mating element. In an alternate embodiment, the latch 302 is configured to automatically engage the mating element when the movable keyboard 300 is inserted into the proper position. By way of example, the blade 310 may be angled to allow vertical pressure to retract the spring bias. Once the latch 310 is aligned with the slot, the spring bias causes the blade 310 to engage the slot.

Referring back to FIG. 3A, the movable keyboard 300 further includes hooks 304. The hooks 304 are configured as extensions that protrude out of the outer perimeter of the movable keyboard 300. The hooks 304 may be configured to be straight, curved or bent protrusions. Preferably, the hooks 304 are configured to coincide with the hook mating elements 224 (e.g., slots), as shown in FIG. 2. Preferably, five hooks are used in a spaced apart relationship in order to distribute loads on the movable keyboard 300 such as loads exerted by a keyboard user during use. However, it should be noted that the movable keyboard 300 is not limited to five hooks and that any number of hooks 304 may be provided so long as they are able to hold the movable keyboard 300 in place and substantially support the movable keyboard 300 during use.

Accordingly, the movable keyboard is positioned in the computer housing (e.g., base 204) by inserting the hooks 304 of the movable keyboard 300 into the slots of the base. Thereafter, the other side of the movable keyboard 300 is lowered into position, while the two latches 302 are retracted to the first position. Once the movable keyboard 300 is in position, the latches 302 are released to return to the second position and thus into the slots of the base. By engaging the hooks 304 and latches 302 within their respective slots, the movable keyboard 300 is substantially secured inside the opening of the housing. To open, the user depresses the left and right latches 302 and once retracted, the moveable keyboard 304 may be removed. Once opened, access to internal components can be achieved.

To assist in the opening or removal of the movable keyboard from the base of the portable computer, an actuator can be provided. In one embodiment, the actuator exerts a force on the movable keyboard to dislodge a portion of the movable keyboard from the opening when the keyboard securing mechanism is disengaged.

Referring back to FIG. 2, the base 204 includes an actuator 250 in accordance with one embodiment of the present invention. Preferably, the actuator 250 is disposed inside the opening 206 and proximate to an edge 252 of the opening 206. In this manner, the force of the actuator 250 on the movable keyboard 202 tends not to produce bowing of the movable keyboard 202, and the actuator 250 is protected and out of the way (e.g., user will not catch their hands on it) when the moveable keyboard 202 is dislodged and/or removed from the opening 206.

Furthermore, the actuator 250 preferably exerts a force on the bottom surface of the movable keyboard 202, i.e., the support member 208, to dislodge the movable keyboard 202 in a direction away from the opening 206. For the most part, the actuator 250 is coupled to a portion of the base 204 or structures housed within the base 204. In a preferred embodiment, the force provided by the actuator 250 is configured to move the movable keyboard 202 a predetermined distance out of the opening 206. The predetermined distance is preferably configured to be large enough to provide an edge of the movable keyboard 202 above the top surface of the base 204 so that a user can easily grasp the movable keyboard 202 without difficulty or without needing any special tools. Furthermore, the force provided by the actuator 250 is configured so that it does not damage the moveable keyboard. Additionally, it should be noted that the force exerted by the actuator may be a continual biased force or a pulsated force and that the actuator may be used to move the movable keyboard 202 along a pivot or used to lift the entire keyboard from the opening 206.

In one embodiment, the actuator 250 is a spring that continually exerts a force on the backside of the movable keyboard 202. In this embodiment, when the keyboard securing system is disengaged (e.g., latch retracted), the spring exerts a force on the movable keyboard 202 that dislodges the movable keyboard 202 from at least a portion of the opening 206 of the base 204. However, the continually applied force of the spring may bow the movable keyboard 202 could cause the keys of a bowed keyboard to touch the LCD screen (e.g., when the lid is closed). Therefore, the spring is preferably positioned proximate to the latch (e.g., 302) to prevent bowing of the movable keyboard 202. However, it should be noted that the spring is not limited by this position and any suitable position could be used. Additionally, it should be noted that a loose spring (i.e., free floating) or a spring coupled to the movable keyboard 202 could be used.

The spring is preferably a 0.30 mm thick stainless steel coil spring. By way of example, the spring may be formed with 304 series stainless steel. However, it should be noted that the spring is not limited to these parameters and that any suitable spring with differing thickness, material and/or type (e.g., flat, spiral, helical, leaf) and/or classification (e.g., tension, compression, torsion) may be used. Furthermore, it should be understood that the actuator 250 is not limited to springs and that any suitable actuating means for dislodging a moveable keyboard from an opening may be used. By way of example, the actuating means may be implemented with air power, fluid power, magnetic power, a motor (e.g., mechanical screw), and/or a deformable material (e.g., foam).

Accordingly, to open the movable keyboard, the user depresses the left and right spring latches (e.g., latches 302). Once the spring latches are retracted, the movable keyboard (e.g., movable keyboard 202, 300) will be sprung up by the spring located on the left edge of the keyboard. To close the movable keyboard, the user depresses the left and right spring latches while moving the movable keyboard against the spring force and towards the opening in the housing. Once the movable keyboard is in position, the spring latches are released into the slots of the housing, securing the movable keyboard in the opening of the housing.

As can be seen from the foregoing, the advantages of the first aspect of the invention are numerous. Different embodiments or implementations may have one or more of the following advantages. One advantage of the invention is that the movable keyboard provides access to the internal components of a computer. For example, the computer user is able to easily access internal components, such as hard drive, modem, memory and processor board, for upgrades and repairs. Another advantage of the invention is that the outer peripheral surfaces of the computer housing are saved for design purposes. That is, the movable keyboard implementation is extremely subtle and therefore enhances the industrial design (e.g., aesthetics) qualities of the product. By way of example, the movable keyboard provides a secret door without producing unwanted industrial design surfaces (i.e., trap doors). Furthermore, by not having increased openings (e.g., trap doors) in the computer housing, the strength of the computer housing is increased and therefore the housing as whole can have a reduced thickness. Still another advantage of the invention is that assembly and maintenance is simplified which reduces manufacturing and maintenance costs associated with labor and parts. Yet another advantage of the invention is that the keyboard securing system provides an easy arrangement for opening and/or moving the keyboard. Still yet another advantages of the invention is that after the securing mechanism has been disengaged, the movable keyboard is automatically dislodged from the base or computer housing.

A second aspect of the invention pertains to a lock arrangement suitable for locking the movable keyboard to the computing device. The lock arrangement operates to lock the movable keyboard to prevent immediate and unwanted access to the internal components of the computer.

In accordance with one embodiment of the second aspect of the present invention, a lock arrangement is preferably configured for locking a movable keyboard in the opening of a computer housing. In this embodiment, the lock arrangement includes a locking member that is movably coupled to a base or computer housing. The locking member is arranged to move to a first position and a second position with respect to the base. Preferably, the locking member includes a mating portion that is configured to engage a portion of the movable keyboard. Correspondingly, when the locking member is in the first position, the mating portion is configured to be engaged with a portion of the moveable keyboard, and when the locking member is in the second position, the mating portion is configured to be disengaged from the portion of the movable keyboard. In this manner, the movable keyboard can be locked or unlocked by moving the locking member.

Moreover, in one embodiment, the locking member has a key head opposite the end having the mating portion. The key head is arranged to have a first key head position and a second key head position. Correspondingly, when the key head is moved from a first key head position to a second key head position, the locking member is moved from the first position to the second position. Preferably, the key head is configured with a key hole, which is configured for accepting a key. By way of example, the key hole may be a tool slot (i.e., screwdriver, alien wrench, etc.) or a conventional toothed key. Keys and key holes are well known to those skilled in the art.

Furthermore, the key head is preferably disposed within an outer peripheral surface of the base. For example, in the input/output area of the base (e.g., area for holding ports such as parallel ports, serial ports, network ports, etc.) of the computer housing. Generally, this area includes a trap door for covering the ports and therefore the key head may be advantageously hidden from sight.

Figure 4:
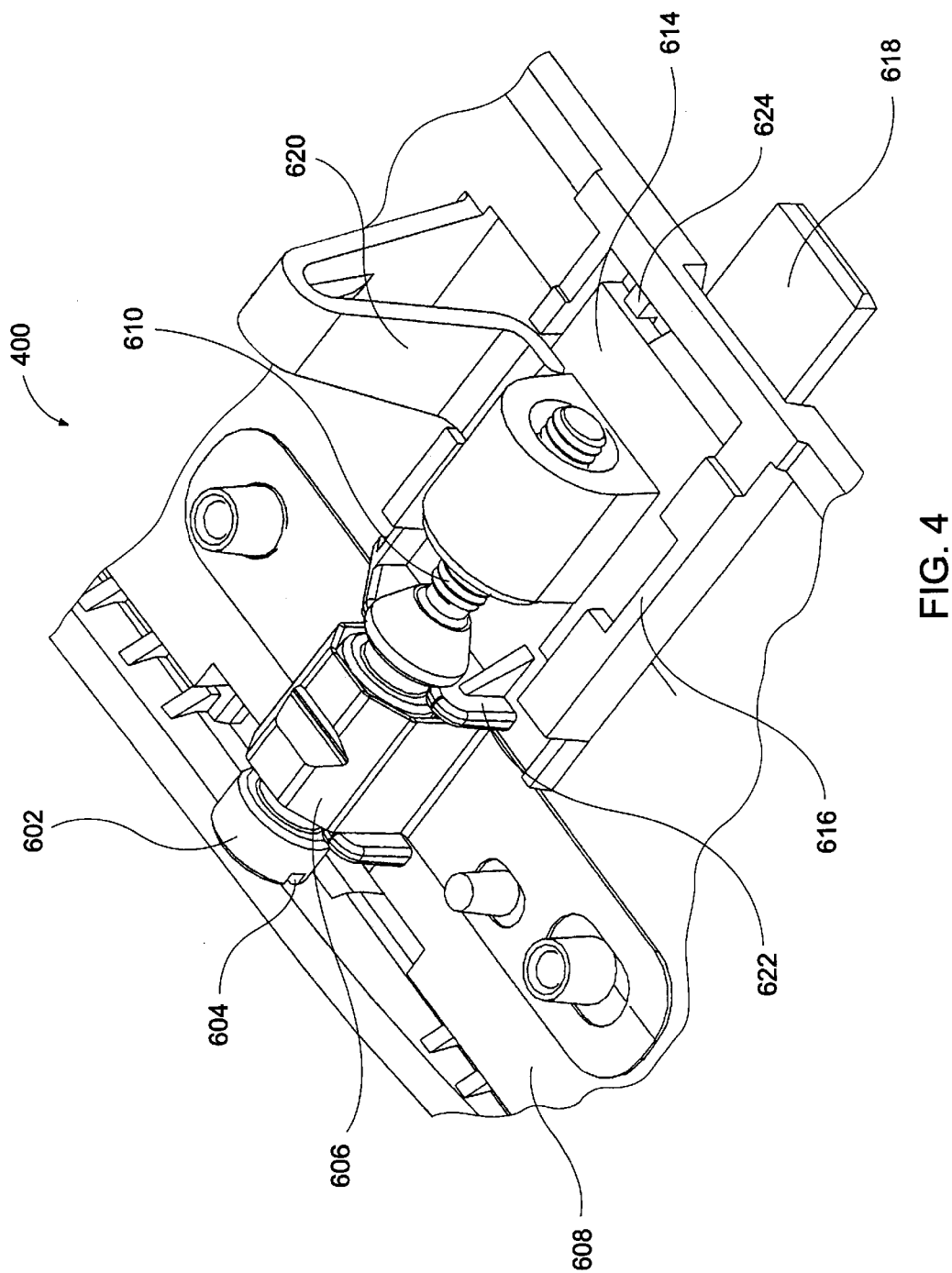
FIG. 4 is a perspective diagram of an exemplary keyboard lock according to one embodiment of the invention.

Referring to FIG. 4, a preferred embodiment of a lock arrangement 400 for locking the movable keyboard is shown, in accordance with one embodiment of the present invention. The lock arrangement 400 includes a key head 602 having a key hole or slot 604 for accepting a key. For example, the key slot 604 can be configured to accept a screwdriver as a key. Furthermore, key head 602 is integrally coupled with a first threaded portion (not shown) that mates with a worm drive (not shown) housed beneath a support member 606. Typically, worm drives are arranged to allow rotational movements of the first threaded portion, rather than lateral movements of the first threaded portion. The support member 606 is affixed to a computer housing 608. Additionally, the first thread portion is coupled with a second threaded portion 610. The second thread portion 610 is preferably configured to mate with a threaded insert (not shown) disposed in a portion of a locking member 614. Correspondingly, when the key head 602 and the first and second threaded portions are rotated, the locking member 614 is laterally moved along the second threaded portion.

Moreover, the locking member 614 is slidably coupled with a channel 616, which is an integrally formed as part of the computer housing 608. Additionally, the locking member 614 includes a blade 618 configured for engaging a slot in a portion of the movable keyboard (not shown). In one embodiment, the movable keyboard slot is disposed in a dummy key of the function key row in the movable keyboard. Preferably, the movable keyboard slot is disposed in the middle dummy key of the movable keyboard (see FIG. 3A). Correspondingly, when the blade 618 is engaged with the slot of the movable keyboard, the movable keyboard is prevented from moving, even when the securing mechanism (e.g., latch) is disengaged.

Furthermore, a snap 620 is used to hold the locking member 614 inside the channel 616. Moreover, a first stop 622 is located at the proximal end of the channel 616 and a second stop 624 is located at the distal end of channel 616. Both of the stops 622, 624 are configured to be integral with the computer housing 608. The first stop 622 is configured to prevent the locking member 614 from excessive movement in a direction towards the key hole head 602. The second stop 624 is configured to prevent the locking member 614 from excessive movement in a direction towards the keyboard. Accordingly, in order to activate the lock arrangement 400 of FIG. 4, the user turns the key head 602 located in the input/output area of the base. By turning the key head 602, the blade 608 is driven into the opening or slot in the movable keyboard. For example, the blade 608 can be driven into an opening or slot in the middle dummy key of the function row of the movable keyboard. In order to deactivate the lock arrangement 400, the user turns the key head in an opposite direction. By turning the key head in the opposite direction, the blade 608 is driven into the channel of the computer housing and out of the slot of the movable keyboard.

The advantages of the second aspect of the invention are numerous. Different embodiments or implementations may have one or more of the following advantages. One advantage of the invention is that the ability to lock the keyboard allows users to protect the internal components, such as hard drive, modem, memory and processor board, from immediate access by unwanted persons. Another advantage of the invention is that the lock is hidden and difficult for someone not familiar with the computer to find and operate.

Furthermore, although the invention is particularly well suited for use in a computer system, namely a portable computer system, the invention is not limited to use in computer systems. The invention is suitable for other devices or apparatuses that include a keyboard.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention. By way of example, the lock may be controlled by the computer through a user password. When the user wants to gain access to the internal components of the computer, the user simply types in a command to the computer, and as a result, the computer unlocks the movable keyboard from the computer.

What is claimed is:

1. A computer system having a keyboard, said computer system comprising:

a computer housing containing internal components, said computer housing having an opening; and a movable keyboard being configured for placement in said opening, said keyboard having a plurality of keys; and a keyboard securing mechanism coupled to said movable keyboard, said keyboard securing mechanism being arranged to secure said movable keyboard to said computer housing, wherein after said movable keyboard is placed in said opening for operation of said computer system, said movable keyboard can be at least substantially moved out of said opening to provide access to the internal components within said computer housing.

2. The computer system as recited in claim 1, wherein said movable keyboard is a removable keyboard.

3. The computer system as recited in claim 1, wherein said computer system further comprises a hinge having a first side coupled to a side of said keyboard and a second side coupled to said computer housing, and wherein said movable keyboard can be at least substantially moved out of said opening to provide access to the internal components within said computer housing by rotation about said hinge.

4. The computer system as recited in claim 1, wherein said computer system further includes an actuator for exerting a force on said movable keyboard such that said actuator moves at least a portion of said movable keyboard out of said opening.

5. A computer system as recited in claim 1, wherein said keyboard securing mechanism is configured to hold said movable keyboard in said opening of said computer housing when said movable keyboard is disposed in said opening of said computer housing.

6. A computer system as recited in claim 1, wherein said keyboard securing mechanism is arranged to couple said movable keyboard to said computer housing by movably engaging a portion of said movable keyboard with said computer housing.

7. A computer system having a keyboard, said computer system comprising:

a computer housing containing internal components, said computer housing having an opening; and a movable keyboard being configured for placement in said opening, said keyboard having a plurality of keys; and a lock being configured to lock said movable keyboard in said opening of said computer housing to prevent said movable keyboard from being moved away from said opening of said computer housing, wherein after said movable keyboard is placed in said opening for operation of said computer system, said movable keyboard can be at least substantially moved out of said opening to provide access to the internal components within said computer housing.

8. A computer system as recited in claim 1, wherein said computer housing is a base of a portable computer.

9. A computer system as recited in claim 4, wherein said actuator is disposed inside said opening of said computer housing.

10. A computer system as recited in claim 4, wherein said actuator is proximate to an edge of said opening of said computer housing.

11. A computer system as recited in claim 4, wherein said actuator exerts said force on a bottom surface of said movable keyboard.

12. A computer system as recited in claim 4, wherein said actuator is a spring.

13. A computer system as recited in claim 5, wherein said movable keyboard is a removable keyboard.

14. A computer system as recited in claim 5, wherein said keyboard securing mechanism comprises:

a hook being configured to engage a first mating element of said computer housing, said hook being coupled to said movable keyboard;

a latch being configured to engage a second mating element of said computer housing, said latch being coupled to said movable keyboard; and wherein said hook and said latch when engaged with said first mating element and said second mating element hold said movable keyboard within said opening of said computer housing.

15. A computer system as recited in claim 14, wherein said latch is configured to movably engage said second mating element of said computer housing, said latch being configured to move between a first position and a second position, and wherein when said latch is in said second position said latch engages said mating element to inhibit moving of said movable keyboard, and when said latch is in said first position said latch disengages from said mating element to allow moving of said movable keyboard.

16. A computer system as recited in claim 14, wherein said hook is on a first side of said movable keyboard and said latch is on a second side of said keyboard, said second side being opposite said first side.

17. A computer system as recited in claim 14, wherein said latch is disposed inside a top row of keys of said movable keyboard.

18. A computer system as recited in claim 14, wherein said latch is disposed inside a function key row of said movable keyboard.

19. A computer system as recited in claim 14, wherein said latch and said hooks are configured to provide load bearing support to said movable keyboard relative to said computer housing.

20. A computer system as recited in claim 6, wherein the keyboard securing mechanism includes a latch, which is arranged to securely link said movable keyboard to said computer housing, and which is adapted for mating with a slot in said computer housing between a mounting condition, securing said latch to said computer housing via said slot, and a removal condition, enabling removal of said latch from said slot.

21. A computer system as recited in claim 15, wherein said latch is a spring-biased latch configured to bias said latch in said position.

22. A computer system as recited in claim 18, wherein said latch is further disposed between a pair of function row keys of said function key row.

23. A portable computer device having a keyboard, said portable computer device comprising:
- a computer housing containing internal components, said computer housing having an opening, said opening providing access to said internal components;
- a removable keyboard being configured for placement in said opening, said keyboard having a plurality of keys; and
- an actuator that exerts a force on said removable keyboard in a direction away from said opening such that said actuator moves at least a portion of said removable keyboard out of said opening, said actuator being positioned proximate an edge of said opening of said computer housing so as to substantially prevent bowing of said removable keyboard when said removable keyboard is secured to said computer housing.

24. A portable computer device having a keyboard, said portable computer device comprising:
- a computer housing containing internal components, said computer housing having an opening; and
- a movable keyboard being configured for placement in said opening, said keyboard having a plurality of keys; and
- a lock being coupled to said computer housing and configured to lock said movable keyboard to said computer housing such that said movable keyboard is prevented from moving away from said computer housing.

25. A portable computer system as recited in claim 24, wherein said computer system further includes an actuator for exerting a force on said movable keyboard such that said actuator moves at least a portion of said movable keyboard out of said opening of said computer housing.

26. A portable computer device as recited in claim 24, wherein said lock includes a locking member having a mating portion, said mating portion having a first position and a second position with respect to said computer housing, said mating portion being configured to engage a portion of said movable keyboard when said mating portion is disposed in said second position and said movable keyboard is disposed in said opening of said computer housing, said mating portion being configured to disengage from a portion of said movable keyboard when said mating portion is disposed in said first position and said movable keyboard is disposed in said opening of said computer housing.

27. A portable computer system as recited in claim 24, wherein said movable keyboard is a removable keyboard.

28. A portable computer device as recited in claim 26 wherein said locking member is coupled to a key head configured with a key hole for accepting a key, said key head being configured to allow movement of said locking member when said key coincides with said key hole.

29. A portable computer device as recited in claim 28, wherein said key head is disposed within outer peripheral surface of said computer housing.

30. A portable computer device as recited in claim 29, wherein said outer peripheral surface is an input/output area of said computer housing.

* * * * *